United States Patent [19]

Massara

[11] Patent Number: 5,779,311
[45] Date of Patent: Jul. 14, 1998

[54] RECLINING SEAT FOR MOTOR VEHICLE

[75] Inventor: Andrew J. Massara, Vargön, Sweden

[73] Assignee: Lear Corporation, Southfield, Mich.

[21] Appl. No.: 837,222

[22] Filed: Apr. 10, 1997

[51] Int. Cl.$^6$ ........................................... B60N 2/02
[52] U.S. Cl. ..................... 297/361.1; 297/374; 297/375
[58] Field of Search .................... 297/361.1, 362.11, 297/374, 375, 354.12; 188/67, 82.3, 82.84, 82.2; 74/531

[56] References Cited

U.S. PATENT DOCUMENTS

| 1,551,730 | 9/1925 | Case | 297/374 |
| 2,595,394 | 5/1952 | Lauterbach | 297/374 |
| 4,536,051 | 8/1985 | Latone | 297/374 X |
| 5,265,936 | 11/1993 | Droulon et al. | 297/361.1 |
| 5,618,083 | 4/1997 | Martone | 297/375 |

FOREIGN PATENT DOCUMENTS

| 2574721 | 6/1986 | France | 297/375 |
| 2041064 | 9/1980 | United Kingdom | 297/375 |

*Primary Examiner*—Laurie K. Cranmer
*Attorney, Agent, or Firm*—Brooks & Kushman P.C.

[57] ABSTRACT

A vehicle seat having a lower seat portion and a seat back portion positionable in a range of angular orientations with a reclining mechanism. The reclining mechanism includes a housing and a strap having oppositely facing sides which are engaged by rollers that are selectively shiftable between a locked position in which the rollers grip the strap and a recline adjustment position in which the rollers release the strap allowing the strap to move relative to the actuator. The rollers are spring-biased toward the locked position in which the rollers wedge against the housing and the strap. A flexible control cable shifts a linkage and cams that are mounted on the housing to engage the rollers. A reinforcing rib is provided on the strap to maintain strap alignment within the actuator.

9 Claims, 2 Drawing Sheets

5,779,311

RECLINING SEAT FOR MOTOR VEHICLE

TECHNICAL FIELD

This invention relates to a vehicle seat having a reclining mechanism.

BACKGROUND ART

Vehicle seat reclining mechanisms are known which use intermeshing gears or gears and locking pawls to releasably lock the position of a seat back relative to a seat base.

Examples of prior art vehicle seat reclining mechanisms include U.S. Pat. No. 4,830,433 to Taka-hashi which discloses a toothed gear sector and pawl-type recliner latch. Another example of a prior art vehicle seat recliner mechanism is disclosed in U.S. Pat. No. 5,104,189 to Hanai, which discloses an electric motor which is used to control the reclining mechanism through a gear reduction unit. Yet another approach to providing a seat back recliner is disclosed in U.S. Pat. No. 4,781,416 to Johnson, which discloses a reclining mechanism utilizing a planetary gear train having an external gear and an internal gear which are driven eccentrically by means of an electric motor.

Such prior art vehicle seat reclining mechanisms are relatively complex, requiring gears, ratchets and pawls that can become misaligned, stripped, or otherwise malfunction. These types of vehicle seat recliners have many parts and are relatively large component parts of the vehicle seat.

Some manual vehicle seat recliners require considerable manual dexterity and strength to actuate the release mechanism required to allow the recliner mechanism to operate.

Many prior art seat recliners have attempted to combine the recliner mechanism with the seat pivot. This approach further complicates packaging the recliner and pivot mechanism within the vehicle seat.

These and other problems relating to vehicle seat reclining mechanisms are addressed and solved by the vehicle seat recliner of the present invention as summarized below.

SUMMARY OF THE INVENTION

It is an object of the present invention to provide a simple and durable vehicle seat recliner mechanism which does not require interengaged gear teeth or sprocket and pawl mechanisms to provide for a selectively releasable latching mechanism for adjusting the inclination of a vehicle seat back.

Another object of the invention is to provide a vehicle seat reclining mechanism which is easy to manually actuate and may also be adapted for actuation by an electrical control.

It is another object of the invention to provide a separate vehicle seat reclining mechanism which is not complicated by incorporating the vehicle seat back pivot connection in the reclining mechanism.

According to the invention, a vehicle seat having a reclining mechanism is disclosed wherein a lower seat portion and a seat back portion are positionable in a range of angular orientations for reclining the seat back portion relative to the lower seat. The reclining mechanism includes a strap having oppositely facing sides which extend between the lower seat portion and the seat back portion. An actuator having shiftable elements engaging oppositely facing sides of the strap are selectively shiftable between a locked position in which the elements grip the strap and a recline adjustment position in which the elements release the strap and allow the strap to move relative to the actuator.

According to another aspect of the invention, the shiftable elements of the actuator are a plurality of rollers or other rotatable elements retained in a housing. Spherical balls, cam lobes or tubular elements could be used in the invention instead of rollers. The rollers are spring-biased toward a locked position.

The strap of the seat reclining mechanism is movable in a linear direction between a fully reclined position and a fully upright position. The rollers may be cylindrical rollers having an axis of rotation which is aligned perpendicular to the linear direction in which the strap moves. The housing has opposed inclined inner surfaces against which the rollers are normally biased to the locked position by the spring and thereby exerts a gripping force on the strap by wedging the rollers toward the strap and against the inclined inner surfaces.

According to another aspect of the invention, a release mechanism such as a flexible control cable operates to shift a linkage which is connected to at least one cam which engages at least one of the rollers to shift the rollers. The rollers exert less pressure on the strap when shifted by the cams, allowing the strap to move.

According to yet another aspect of the invention, the strap of the vehicle seat reclining mechanism is substantially rigid and includes a reinforcing rib extending in a linear direction corresponding to the direction that the strap moves as the strap shifts between a reclined position and an upright position. The reinforcing rib may be a semi-circular rib, a perpendicularly extending flange, or any other desired generally elongated shape.

According to another aspect of the invention, the actuator includes a housing defining a passageway for the strap having top and bottom inclined surfaces adjacent the front and rear openings of the housing. The shiftable elements include at least two pairs of rollers with one pair of rollers engaging opposite facing sides of the strap adjacent the front opening and a second pair of rollers engages the opposite facing sides of the strap adjacent the rear opening. The rollers engaging the top inclined surfaces on the same side of the strap are acted upon by a first spring which urges the rollers against the top inclined surfaces and the strap. The rollers engaging the bottom inclined surfaces and the same side of the strap are acted upon by a second spring which urges the rollers against the bottom inclined surfaces and the strap. A plurality of cams are provided in the actuator with at least one cam engaging each of the rollers to selectively drive the rollers against the biasing force exerted by the springs. The cams reduce the pressure exerted by the rollers on the strap to thereby allow the strap to move through the housing and change the angular orientation of the seat back portion of the vehicle seat relative to the lower seat portion.

According to a further aspect of the invention, a right and left hand set of rollers may be provided adjacent each of the inclined surfaces and the strap with the reinforcing rib extending between the right and left hand sets of rollers to provide additional gripping force and smoother operation. The alignment rib serves to keep the strap on track within the housing and the duplicate sets of rollers on both sides of the reinforcing rib provide a redundant locking system.

These and other objects and advantages of the present invention will be apparent to one of ordinary skill in the art upon reviewing the attached drawings in light of the following detailed description of the invention.

BEST MODE(S) FOR CARRYING OUT THE INVENTION

Figure 1:
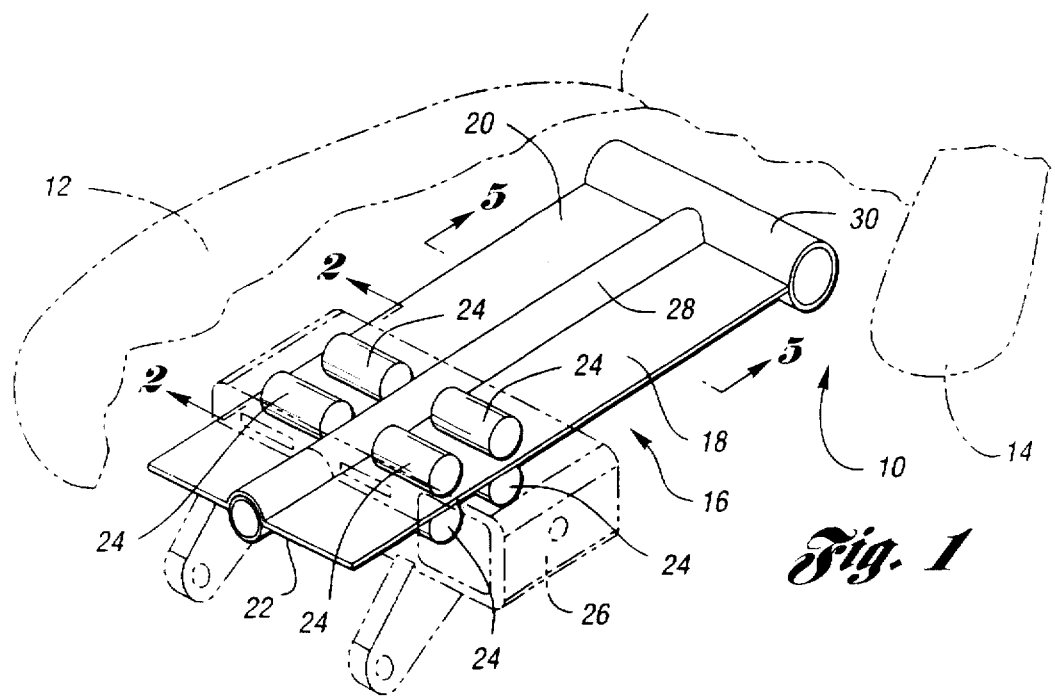
FIG. 1 is a partially fragmented, perspective view of a vehicle seat including the seat back reclining mechanism of the present invention.

Referring now to FIG. 1, a vehicle seat 10 including a lower seat portion 12 and a seat back portion 14 is generally illustrated. A reclining mechanism 16 is provided to allow the seat back portion 14 to be moved between a reclined position and an upright position when the reclining mechanism is placed in a recline adjustment position. The reclining mechanism 16 includes a strap 18 having first and second sides 20 and 22. A plurality of rollers 24 are disposed on first and second sides 20 and 22 of the strap 18. The rollers 24 and part of the strap 18 are disposed within a housing 26 which is shown in phantom. The strap 18 includes a semi-circular rib 28 which extends lengthwise on the strap 18 in a linear direction corresponding to the direction that the strap 18 moves within the housing 26. A tube 30 is shown at one end of the strap 18. The tube 30 is provided for connecting the seat back portion 14 to the strap 18. Alternatively, brackets or other types of securing mechanisms could be provided in place of the tube 30.

Figure 2:
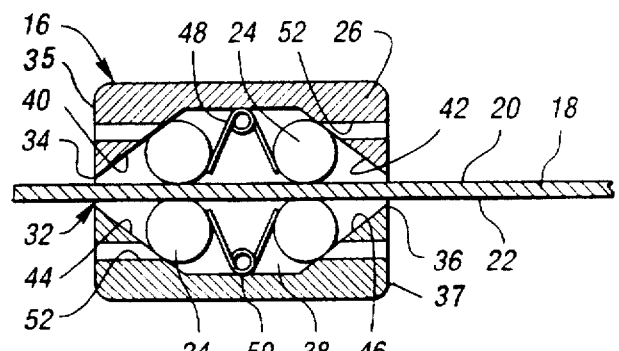
FIG. 2 is a cross-sectional view taken along the line 2—2 in FIG. 1.

Referring now to FIG. 2, a passageway 32 is provided through the housing 26. The passageway 32 extends from a front opening 34 in a front wall 35 of the housing 26 to a rear opening 36 in a rear wall 37 of the housing 26 and through an interior space 38 defined by the housing 26. The interior space 38 includes a top front inclined surface 40 and a top rear inclined surface 42. The housing 26 also includes bottom front inclined surface 44 and bottom rear inclined surface 46. At least one roller 24 is provided adjacent each of the inclined surfaces 40, 42, 44 and 46. A top right spring 48 is provided between two rollers 24 and exerts a biasing force driving the rollers 24 outwardly and into engagement with the top, front and rear inclined surfaces 40 and 42. Bottom right spring 50 engages rollers 24 in the bottom portion of the housing 26 below the strap 18 on the second side 22 of the strap 18 and biases the rollers 24 into engagement with the bottom, front and rear inclined surfaces 44 and 46. The biasing force exerted by the springs 48 and 50 must be sufficient to lock the strap 18 in place in the housing 26. The rollers 24 are intended to normally be wedged between the inclined surfaces and the strap 18 to form a lock without the necessity of providing interlocking gears, locking pawls or a gear reducer.

It should be understood that directional references such as up/down and right/left as used herein are intended as an example and that the reclining mechanism 16 may be mounted in an angular orientation different than is shown in the drawings. If so, the directional references should be understood to be relative and not in a limiting or absolute sense.

Cam slots 52 are shown in FIG. 2 adjacent each of the rollers 24. Operation of the cams to disengage the rollers 24 from their locking position may be referenced to as the recline adjustment position and will be explained in greater detail with reference to FIG. 3.

Figure 3:
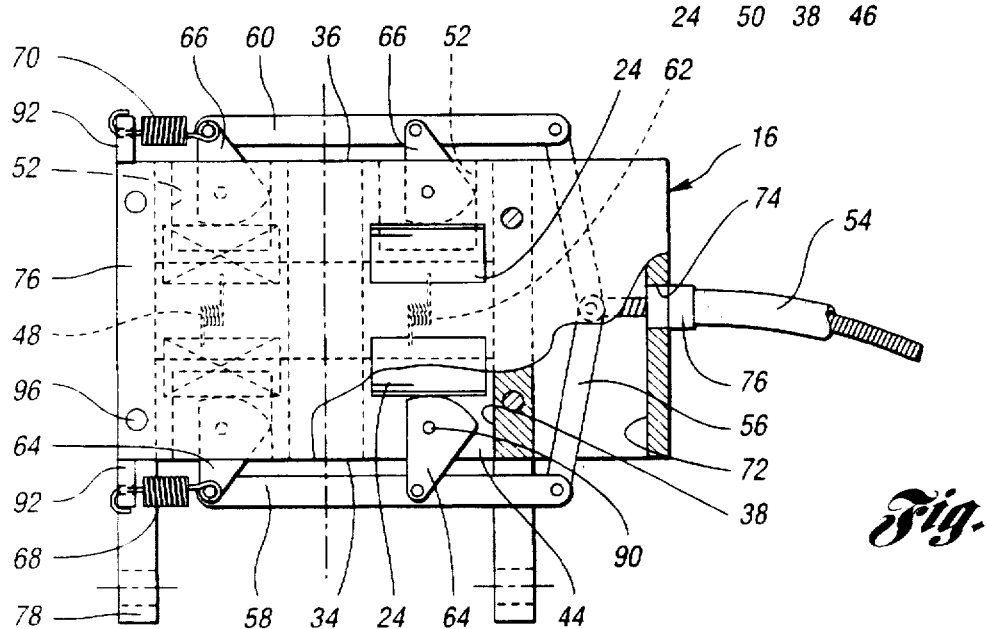
FIG. 3 is a top plan view partially fragmented away of the vehicle seat reclining mechanism of the present invention.

Referring now to FIG. 3, a control cable 54 is connected to a Y linkage 56 which interconnects the control cable with front and rear links 58 and 60. In FIG. 3, the top left spring 62 is shown that was not visible in FIG. 2. Front and rear cams 64 and 66 are received within cam slots 52 formed in the housing 26. Front and rear cams 64 and 66 are connected to front and rear links 58 and 60, respectively. The front and rear links 58 and 60 are operable to move the front and rear cams 64 and 66 when the control cable 54 is pulled to disengage the rollers 24 from their locked position and thereby function as a release mechanism. The front and rear return springs 68 and 70 are connected to front and rear links 58 and 60, respectively. Y linkage 56 is connected to control cable 54 inside linkage channel 72, which forms part of the housing 26. A cable aperture 74 is formed in the housing 26 and the control cable 54 is received therein. A cable fitting 76 is affixed to the housing 26 at the cable aperture 74 to permit the control cable 54 to be connected to the housing 26, as is well known in the art.

The housing 26 also includes a bracket 78 which is used to affix the reclining mechanism 16 to the lower seat portion 12. The reclining mechanism 16 may also be secured to another portion of the vehicle by other fastening mechanisms.

Figure 4:
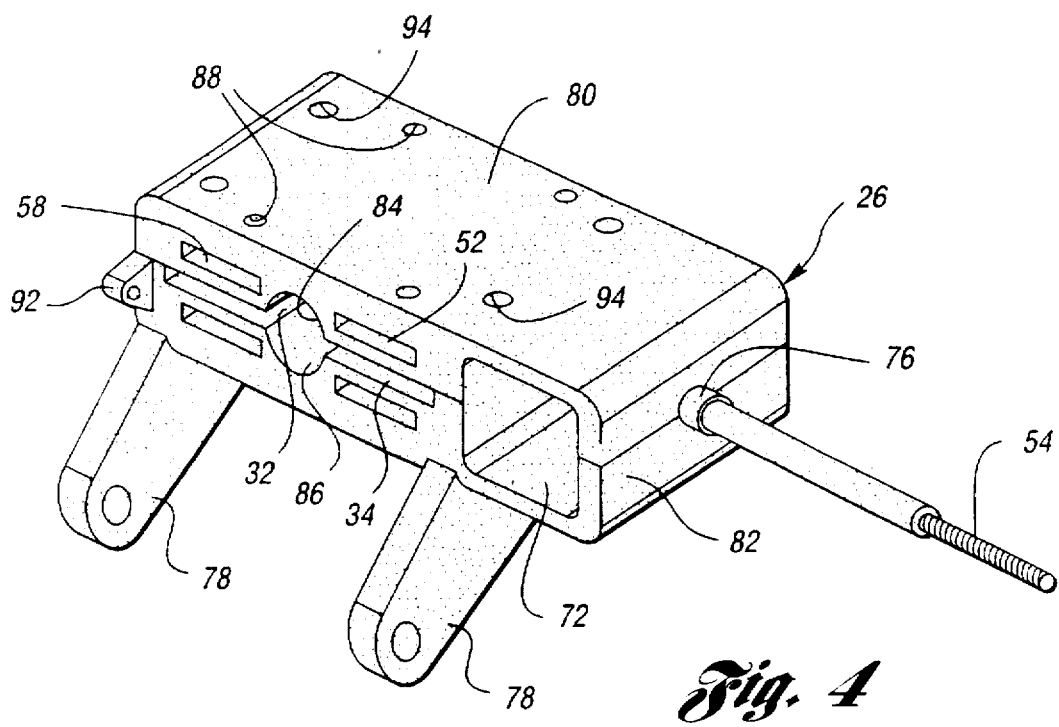
FIG. 4 is a perspective view of a housing and cable for the vehicle seat reclining mechanism of the present invention.

Referring now to FIG. 4, a housing cap 80 and housing base 82 are assembled together to make up the housing 26. A top alignment groove 84 is provided in the housing cap 80 and a bottom alignment groove 86 is provided in the housing base 82. Rib 28 and tube 30 are received within the top and bottom alignment grooves 84 and 86 as shown. Cam pivot holes 88 are shown in the housing cap 80 and corresponding pivot holes are also provided in the housing base 82. A cam pivot pin 90 is received in the cam pivot hole 88 and front and rear cams 64 and 66. The front and rear cams 64 and 66 are mounted on the pivot pins 90 for pivoting motion which allows them to engage and disengage the rollers 24. A spring anchor 92 is provided on the housing base 82. Front return spring 68 is secured between the spring anchor 92 and the front link 58, as shown in FIG. 3. A spring anchor 92 is also provided on the rear of the housing 26 and connected by rear return spring 70 to the rear link 60. Assembly holes 94, as shown in FIG. 4, are provided to receive fasteners 96, as shown in FIG. 3. The fasteners 96 are received in the assembly holes 94 to hold the housing cap and base 80 and 82 together.

Figure 5:
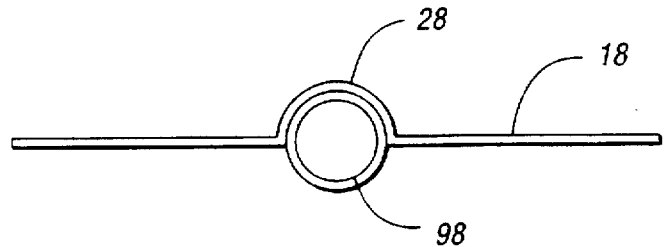
FIG. 5 is a cross-sectional view taken along the line 5—5 in FIG. 1.

Referring now to FIG. 5, the strap 18 is shown to include rib tube 98 which is fitted into the rib 28 on the second side 22 of the strap 18. Rib tube 98 reinforces the strap 18 and provides a convenient guide which is movable within the top and bottom alignment grooves 84 and 86 of the housing cap and base 80 and 82.

Figure 6:
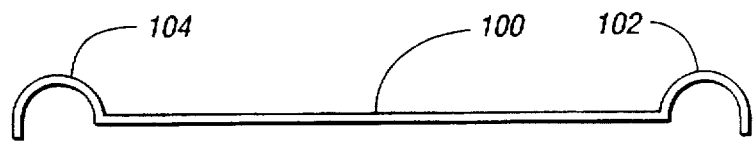
FIGS. 6, 7 and 8 are cross-sectional views of alternative embodiments of the strap portion of the vehicle seat reclining mechanism of the present invention.

Referring now to FIG. 6, an alternative strap 100 is shown which includes right and left ribs 102 and 104 which comprise semicircular ribs that are disposed on right and left sides of the strap 100.

Figure 7:
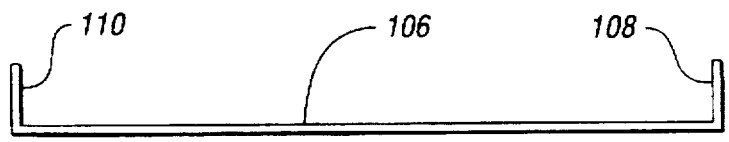

Referring now to FIG. 7, another alternative embodiment of the strap 106 is shown. Right and left flanges 108 and 110 are provided on right and left sides of the strap 106. The flanges 108 and 110 can be captured within grooves formed in an alternative embodiment of a housing (not shown).

Figure 8:
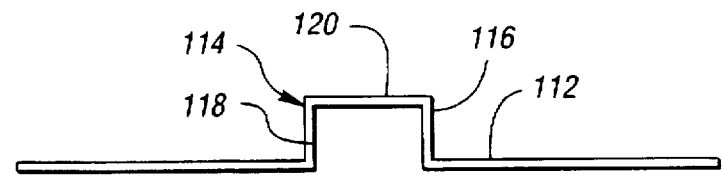

Referring now to FIG. 8, an alternative embodiment of the strap 112 is shown wherein a square rib 114 is formed in the center of the strap 112 to extend longitudinally along the strap 112. The square rib 114 includes right and left flanges 116 and 118 which are interconnected by a central portion 120. Right and left flanges 116 and 118 preferably extend generally perpendicularly from the strap 112, but alternatively may be formed with a different angular orientation relative to the strap 112.

The preceding description of the invention is intended as providing examples of the present invention and is not to be read to limit the invention to only the embodiments shown. The scope of the invention should be determined by reference to the following claims.

What is claimed is:

1. A vehicle seat comprising:
   a lower seat portion;
   a seat back portion supported adjacent the lower seat portion in a range of angular orientations for reclining the seat back portion relative to the lower seat portion;
   a strap having first and second sides extending between the lower seat portion and the seat back portion;
   an actuator having at least two rollers engaging the first and second sides of the strap, said rollers being selectively shiftable between a locked position in which the rollers are spring biased to grip the strap and a recline adjustment position in which the rollers release the strap, said strap being movable in a linear direction between a reclined position and a upright position, said rollers having an axis of rotation aligned perpendicular to the linear direction in which said strap moves.

2. The vehicle seat of claim 1 wherein said housing has at least two opposed inclined inner surfaces against which the rollers are biased to the locked position by at least one spring to exert a grip on said strap by wedging the rollers toward the strap and against the inclined inner surfaces.

3. A vehicle seat comprising:
   a lower seat portion;
   a seat back portion supported adjacent the lower seat portion in a range of angular orientations for reclining the seat back portion relative to the lower seat portion;
   a strap having first and second sides extending between the lower seat portion and seat back portion;
   an actuator having at least two rollers engaging the first and second sides of the strap, said rollers being selectively shiftable between a locked position in which the rollers are spring biased to grip the strap and a recline adjustment position in which the rollers release the strap;
   a release mechanism shifts the rollers to their recline adjustment position, said release mechanism is a flexible control cable operative to shift a linkage, said linkage being connected to at least one cam which engages and shifts at least one of said rollers to cause said roller to exert less pressure on the strap.

4. A vehicle seat comprising:
   a lower seat portion;
   a seat back portion supported adjacent the lower seat portion in a range of angular orientations for reclining the seat back portion relative to the lower seat portion;
   a strap having first and second oppositely facing sides "strap" extending between the lower seat portion and the seat back portion, said strap being substantially rigid and including a reinforcing rib extending in a linear direction corresponding to the direction that the strap moves as the strap shifts between a reclined position and an upright position, said reinforcing rib is a semicircular rib disposed in the center of the strap an actuator having at least two shiftable elements engaging the first and second oppositely facing sides of the strap, said shiftable elements being selectively shiftable between a locked position in which the shiftable elements grip the strap and a recline adjustment position in which the shiftable elements release the strap and allow the strap to move relative to the actuator.

5. A vehicle seat comprising:
   a lower seat portion;
   a seat back portion supported adjacent the lower seat portion in a range of angular orientations for reclining the seat back portion relative to the lower seat portion;
   a strap having first and second oppositely facing sides extending between the lower seat portion and the seat back portion;
   an actuator having at least two shiftable elements engaging the first and second oppositely facing sides of the strap, said shiftable elements being selectively shiftable between a locked position in which the shiftable elements grip the strap and a recline adjustment position in which the shiftable elements release the strap and allow the strap to more relative to the actuator, said actuator further comprises:
   a housing having a bracket for securing the housing relative to the lower seat portion, said housing defining a passageway for said strap including an interior space, a front opening in a front wall of said housing and a rear opening in a rear wall of said housing, said interior space having top and bottom inclined surfaces adjacent said front opening and top and bottom inclined surfaces adjacent said rear opening;
   said shiftable elements including at least two pairs of rollers, wherein a first pair of rollers engages oppositely facing sides of said strap and said top and bottom inclined surfaces adjacent said front opening and a second pair of rollers engages oppositely facing sides of said strap and said top and bottom inclined surfaces adjacent said rear opening;
   said rollers engaging the top inclined surfaces and the same side of the strap being acted upon by a first spring which urges the rollers against the top inclined surfaces and the strap, and said rollers engaging the bottom inclined surfaces and the same side of the strap being acted upon by a second spring which urges the rollers against the bottom inclined surfaces and the strap; and
   a plurality of cams with at least one cam engaging each of said rollers to selectively drive said rollers against the biasing force exerted by the first and second springs and reduce the pressure exerted by said rollers on said strap to thereby allow the strap to move through the housing and change the angular orientation of the seat back portion of the vehicle seat relative to the lower seat portion.

6. The vehicle seat of claim 5 wherein said strap extends through said front opening, said interior space, and said rear opening to the seat back portion, said strap being secured to the seat back portion.

7. A vehicle seat comprising:
   a lower seat portion;
   a seat back portion supported adjacent the lower seat portion in a range of angular orientations for reclining the seat back portion relative to the lower seat portion;
   a strap having first and second oppositely facing sides extending between the lower seat portion and the seat back portion;
   an actuator having at least two shiftable elements engaging the first and second oppositely facing sides of the strap, said shiftable elements being selectively shiftable between a locked position in which the shiftable elements grip the strap and a recline adjustment position in which the shiftable elements release the strap and allow the strap to move relative to the actuator, wherein said actuator further comprises:

a housing secured relative to the lower seat portion, said housing defining a passageway for said strap including an interior space, a front opening in a front wall of said housing and a rear opening in a rear wall of said housing, said interior space having top and bottom inclined surfaces adjacent said front opening and top and bottom inclined surfaces adjacent said rear opening, said housing having an alignment groove for receiving a rib formed on the strap, said alignment groove extending through said passageway;

said shiftable elements including a first and second pair of rollers on the right side of said alignment groove, wherein said first pair of rollers engages oppositely facing sides of said strap and said top and bottom inclined surfaces adjacent said front opening and said second pair of rollers engages oppositely facing sides of said strap and said top and bottom inclined surfaces adjacent said rear opening, and a third and fourth pair of rollers on the left side of said alignment groove, wherein said third pair of rollers engages oppositely facing sides of said strap and said top and bottom inclined surfaces adjacent said front opening and said fourth pair of rollers engages oppositely facing sides of said strap and said top and bottom inclined surfaces adjacent said rear opening;

said rollers of the first and second pair engaging the top inclined surfaces and the same side of the strap being acted upon by a first spring which biases the rollers against the top inclined surfaces and the strap, and said rollers of said first and second pair engaging the bottom inclined surfaces and the same side of the strap being acted upon by a second spring which biases the rollers against the bottom inclined surfaces and the strap;

said rollers of the third and fourth pair engaging the top inclined surfaces and the same side of the strap being acted upon by a third spring which biases the rollers against the top inclined surfaces and the strap, and said rollers of said third and fourth pair engaging the bottom inclined surfaces and the same side of the strap being acted upon by a fourth spring which biases the rollers against the bottom inclined surfaces and the strap; and a plurality of roller engaging members with at least one roller engaging member engaging each of said rollers to selectively drive said rollers against a biasing force exerted by the first, second third and fourth springs and reduce the biasing force exerted by said rollers on said strap to thereby allow the strap to move through the housing and change the angular orientation of the seat back portion of the vehicle seat relative to the lower seat portion.

8. The vehicle seat of claim 7 wherein said roller engaging members are pivotably attached to said housing and to at least one link of a linkage which is operatively connected to a flexible control cable.

9. The vehicle seat of claim 8 wherein said linkage is biased by a spring to a locked position wherein roller engaging members are not driving the rollers against the biasing force exerted by the springs.

* * * * *